United States Patent [19]
Gross

[11] 3,901,447
[45] Aug. 26, 1975

[54] IRRIGATION SYSTEM

[76] Inventor: Jack R. Gross, 732 Cambridge, Fresno, Calif. 93704

[22] Filed: Feb. 27, 1974

[21] Appl. No.: 446,145

[52] U.S. Cl. ............... 239/139; 165/156; 239/550
[51] Int. Cl.² ......................................... B05B 1/24
[58] Field of Search .......... 239/139, 128, 133, 134, 239/136, 75, 550, 551; 165/156

[56] References Cited
UNITED STATES PATENTS

| | | | |
|---|---|---|---|
| 2,341,319 | 2/1944 | Graham et al. ................. | 165/156 |
| 3,229,409 | 1/1966 | Johnson ......................... | 239/139 X |
| 3,457,437 | 7/1969 | Shih ............................... | 165/156 X |
| 3,584,194 | 6/1971 | Kautz et al. .................... | 239/135 X |

Primary Examiner—M. Henson Wood, Jr.
Assistant Examiner—Michael Mar
Attorney, Agent, or Firm—Huebner & Worrel

[57] ABSTRACT

An improved irrigation system of the type including a plurality of distribution conduits equipped with uniformly spaced spray heads for emitting temperature-controlling bodies of mist, and a continuous-flow heat exchanger for supplying heated water to the spray heads. The heat exchanger includes a fire box of a tubular configuration, a tubular shell defining about the fire box a cylindrical water jacket for conducting a stream of water along a tortuous path extended about the external surface of the fire box, and a pressure burner connected with the fire box for projecting a plume of heated gases through the fire box in an axial direction substantially opposite to the direction in which the tortuous path is extended.

9 Claims, 7 Drawing Figures

IRRIGATION SYSTEM

BACKGROUND OF THE INVENTION

The invention relates to an improved irrigation system and more particularly to an improved system of the type provided with a plurality of uniformly spaced spray heads for emitting temperature-controlling bodies of mist in citrus groves and the like.

The prior art, of course, includes irrigation systems of the type including a pressurized source of water a plurality of distribution conduits connected with the source of water and equipped with a plurality of uniformly spaced spray heads for emitting temperature-controlling bodies of mist. Normally, the bodies of mist are projected upwardly from the ground in enveloping relaton with adjacent trees in order to prevent the trees from suffering the effects of the temperature of ambient atmosphere. While such systems can be employed in reducing temperatures, they more frequently are employed in elevating the temperatures in order to avoid frost damage. Moreover, while such irrigation systems often are employed in groves, such as citrus groves, the systems, where desired, are employed in controlling temperatures for row crops and the like.

In order to elevate the temperatures of the ambient atmosphere, the water emitted by the spray heads must be heated in sufficient quantities and to temperatures which facilitate a distribution of the water into temperature-controlling bodies of mist, before the heat is given up as it is delivered to the spray heads.

Heretofore, attempts have been made to heat relatively large bodies of water confined in tanks employing a plurality of so-called immersion heaters. Unfortunately, this arrangement has not proven to be entirely satisfactory becuause of various difficulties, not the least of which is a lack of efficiency and dependability, particularly where large bodies of water must be heated unattended in remote locations.

It is therefore a general purpose of the instant invention to provide in an improved irrigation system of the type including a plurality of distribution conduits connected with a source of water and equipped with a plurality of uniformly spaced spray heads for emitting temperature-controlling bodies of mist, an improved continuous-flow heat exhanger having a capability of efficiently and dependably delivering sufficient quantities of water over an increased life span, at temperatures appropriate for controlling the tmeperatures of ambient atmosphere in citrus groves and the like.

OBJECTS AND SUMMARY OF THE INVENTION

It is therefore an object of the instant invention to provide an improved irrigation system which overcomes the aforementioned disadvantages and difficulties.

It is another object to provide in an irrigation system of the type including spray heads for emitting temperature-controlling bodies of mist a continuous-flow heat exhcanger.

It is another object to provide an improved continuous-flow heat exchanger having an increased operative life and particularly suited for use with irrigation systems.

It is another object to provide an improved heat exchanger having an increased capability for heating relatively large quantities of water delivered in a continuous flow therethrough.

It is another object to provide for use in an irrigation system an improved continuous-flow heat exchanger including a fire box, a water jacket for conducting a stream of water along a tortuous path extended along the external surface of the fire box and a pressure burner for projecting a plume of heated gases axially through the tubular fire box in a direction opposed to the direction in which the path is extended.

These and other objects and advantages are achieved by providing in an irrigation system of the type including a pressurized source of water, a plurality of distribution conduits connected with the source of water and equipped with a plurality of uniformly spaced spray heads for emitting temperature-controlling bodies of mist, an improved continuous-flow heat exchanger which includes a fire box of a tubular configuration, a water jacket of a cylindrical configuration having disposed therewithin a baffle system for conducting a stream of water along a tortuous path in contiguous relation with the tubular fire box and a pressure burner for projecting a plume of heated gases axially through the fire box, as will hereinafter become more readily apparent by reference to the following description and claims in light of the accompanying drawings.

DESCRIPTION OF THE PREFERRED EMBODIMENT

Figure 1:
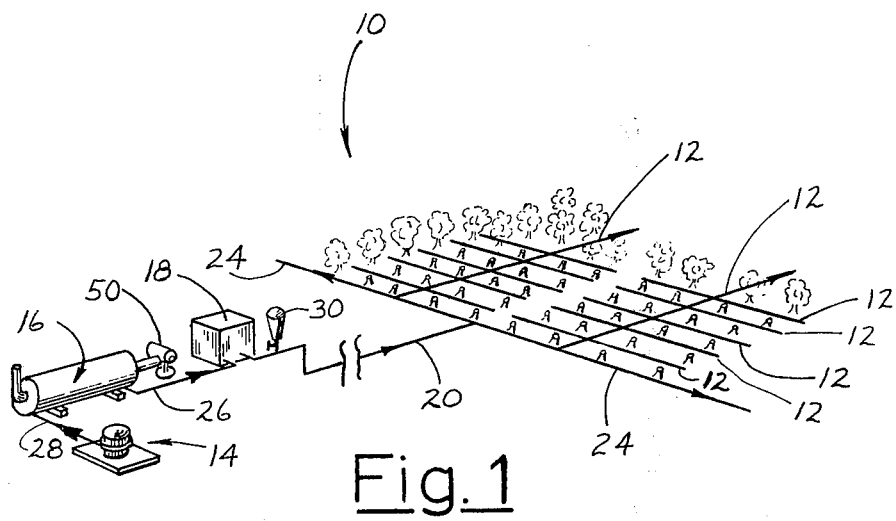
FIG. 1 is a schematic view depicting an irrigation system which embodies the principles of the instant invention.
Figure 2:
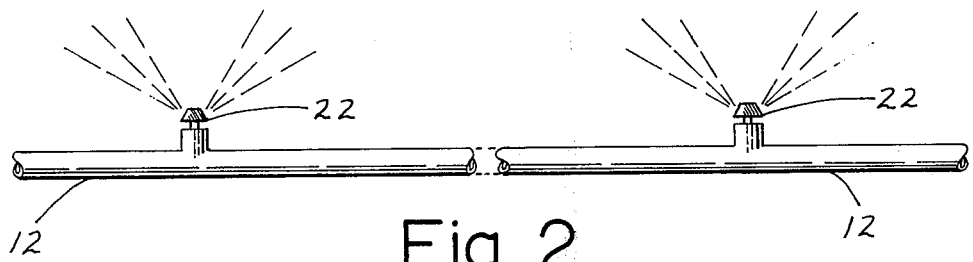
FIG. 2 is a fragmented elevational view of a distribution conduit employed in the system depicted in FIG. 1.
Figure 3:
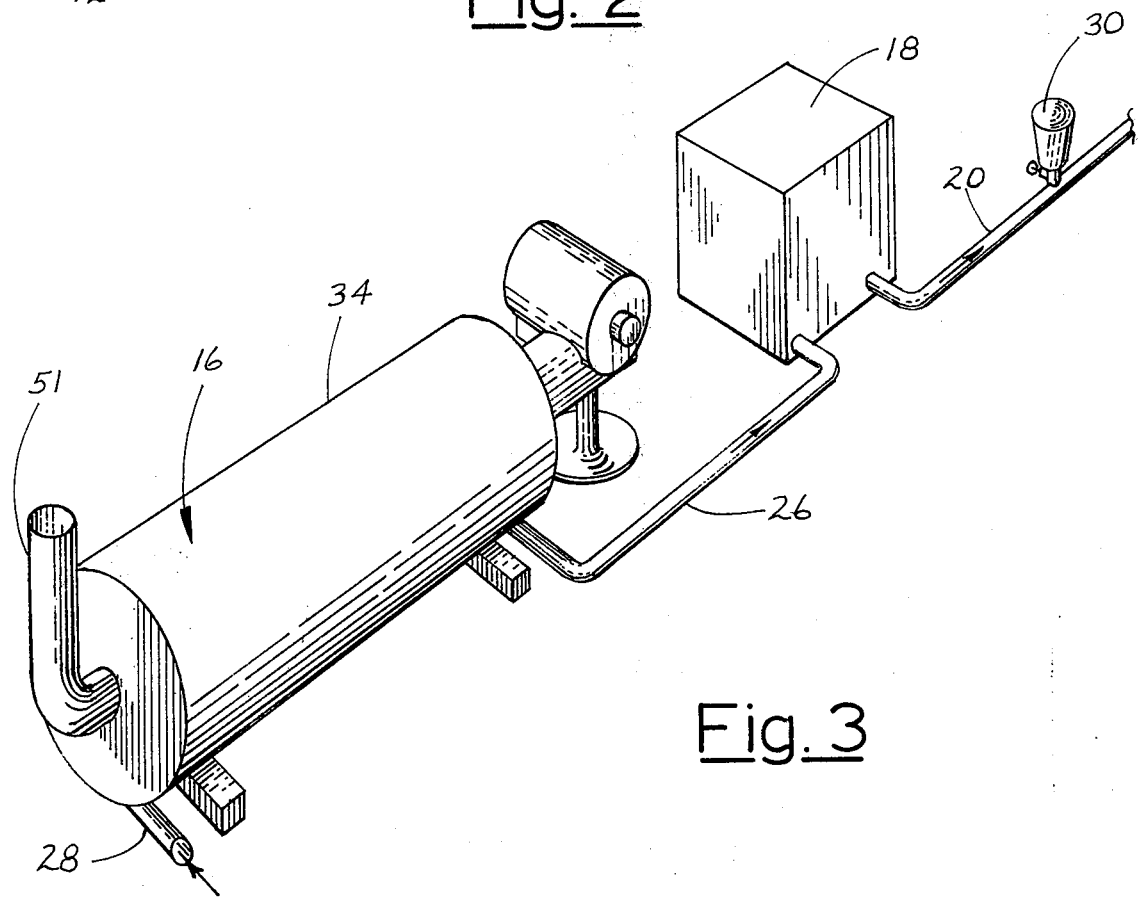
FIG. 3 is a perspective view, on somewhat of an enlarged scale, of a continuous-flow heat exchanger shown in FIG. 1.

Referring now to the drawings wherein like reference characters designate like or corresponding parts throughout the several views, there is shown in FIG. 1 an improved irrigation system generally designated 10, which embodies the principles of the instant invention.

The system 10, as shown, includes a plurality of distribution conduits 12 connected with a pressurized source of water, such as a pump 14, through a heat exchanger 16, a filter unit 18, and a suitable supply main 20.

As hereinbefore mentioned, the system 10 is particularly suited for use in protecting citrus groves from the effects of law temperatures, however, the system 10 can readily be employed in controlling the temperatures of ambient atmosphere as found in orchards, fields and groves, wherein various agricultural products are produced under the thread of adverse temperatures. It is, therefore, to be understood that the system 10 has utility in controlling temperatures in various environments.

The distribution conduits 12 are formed of commercially available, lightweight tubing, preferably flexible tubing, extruded from materials such as polyvinyl chloride and the like. However, the particular material from which the conduits are formed is deemed to be a matter of convenience.

Each of the conduits 12 is provided, at predetermined distances, with a plurality of spray heads 22 which serve to deliver particles of water which form bodies of a fog-like mist. These bodies are at elevations sufficient to substantially envelop surrounding plants, trees and the like. The conduits 12, in turn, are connected with the supply main 20 through a suitable header, herein designated 24. The supply main extends between the header 24 and a filter unit 18 which serves to extract sand and similar foreign material from water delivered from the pump 14. As a practical matter, the filter unit 18 is of any suitable design which has a capacity sufficient to adequately filter the water passed therethrough to the supply main 20. Since the filter 18 forms no specific part of the instant invention and such filters readily are available, a detailed description of the filter unit 18 is omitted in the interest of brevity.

The heat exchanger 16 is, in turn, connected with the filter unit 18, at its input side, through a discharge conduit 26 and to the discharge side of the pump 14 through an intake conduit 28. The purpose of the heat exchanger 16 is to transfer a sufficient quantity of heat to a stream of water, as it flows from the pump 14 to the filter 18, for continuously supplying a sufficient quantity of water at a predetermined temperature to the spray heads 22.

It often is desirable to introduce chemicals of various types into the stream of water prior to its delivery to the distribution conduits 12. Therefore, a suitable dispenser 30 is connected with the supply main 20. While the dispenser 30, as illustrated, is particularly suited for dispensing powdered or granulated chemicals, it is to be understood that similar dispensers are, where desired, provided for introducing liquids into the stream of water.

Figure 4:
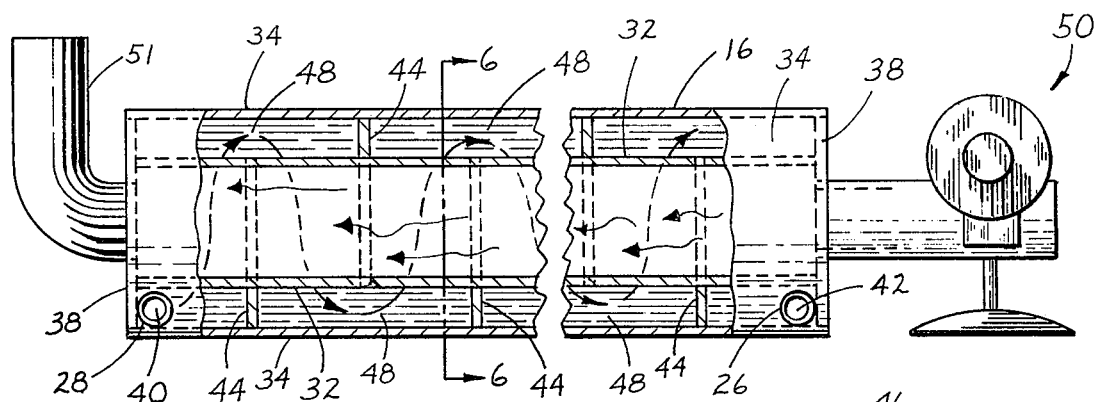
FIG. 4 is a segmented cross sectional view of the heat exchanger shown in FIG. 3.
Figure 5:
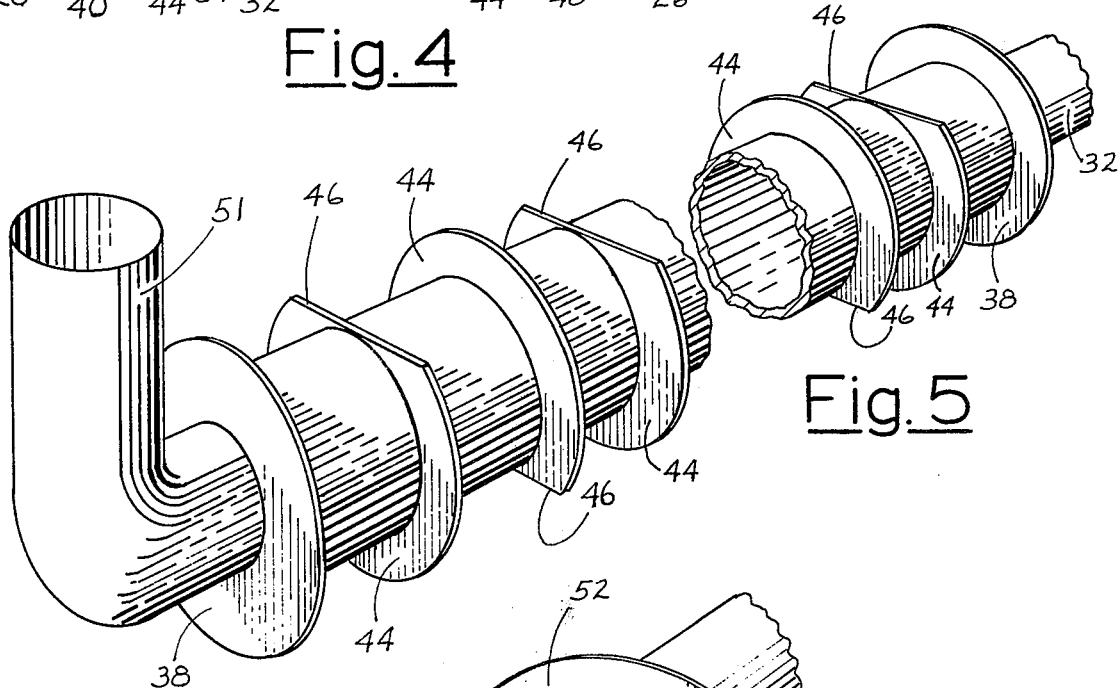
FIG. 5 is a segmented perspective view of a fire box upon which is mounted a plurality of axially spaced truncated baffle plates provided for establishing a tortuous path for conducting a stream of water, through the heat exchanger.

As best shown in FIG. 4, the heat exchanger 16 preferably is of an all-welded construction and includes a fire box 32 of a cylindrical configuration, open at each of its opposite ends, and a concentrically related shell 34, also of a cylindrical configuration. The shell 34 serves to establish about the fire box 32 a cylindrical water jacket 36. In practice, the water jacket 36 is closed at each of its opposite ends by an end plate 38 of a substantially annular configuration.

The intake conduit 28 communicates with the water jacket 36 through a coaxially aligned intake port 40, with the axis thereof being extended in a substantially tangential direction with respect to the external surface of the fire box 32. The discharge conduit 26 communicates with the water jacket 36 through a discharge port 42, also having its axis extended in a substantially tangential direction with respect to the fire box 32. Thus the stream of water enters and exits the water jacket 36 in directions substantially tangential to the external surface of the fire box 32.

Disposed at equidistances along the external surface of the fire box 32, there is provided a plurality of axially spaced, truncated baffle plates 44. Each of the baffle plates 44 includes a surface of truncation 46 which cooperates with the internal surface of the shell 34 to establish a passageway 48 between the surface of the fire box 32 and the adjacent surface of the shell 34.

The baffle plates 44 are so oriented, relative to each other, that adjacent passageways 48 occur in sequence 180° apart. Therefore, the stream of water is caused to advance along a tortuous path of a substantially serpentine configuration extended along the external surface of the fire box 32, as the stream flows from the intake port 40 to the discharge port 42.

At the downstream end of the heat exchanger 16 there is provided a power pressure burner 50. This burner serves to establish within the fire box 32 an axially extended plume of burning gases, whereby a flow of heated gases is established axially through the fire box 32. Since the power pressure burner 50 forms no specific part of the instant invention and such devices are commercially available, a detailed description of the pressure burner 50 is omitted in the interest of brevity. However, it is to be understood that each of the burners frequently utilize atomized diesel oil and similar fuels injected under pressure into the fire box 32, through a spray nozzle not shown, where combustion of the fuels occurs. For purposes of supporting combustion, air is thoroughly mixed with the atomized fuel prior to its being delivered to the fire box, in a manner well understood by those familiar with pressure burners.

Where preferred, an exhaust stack 51 is mounted on the heat exchanger 16 in coaxial alignment with the internal surface of the fire box 32 for conducting by-products of combustion away from the heat exchanger 16.

It is important to note that the direction of the stream of heated gases established by the pressure burner 50 flows in opposition to the axial direction in which the stream of water flows through the heat exchanger 16. Thus it is possible to avoid the fatiguing effects of thermal shock at the juncture of the intake conduit 28 with the shell 34, due to the fact that the stream of water is relatively cool as it enters the water jacket 36 and reaches its maximum temperatures just prior to exiting the water jacket.

Figures 6, 7:
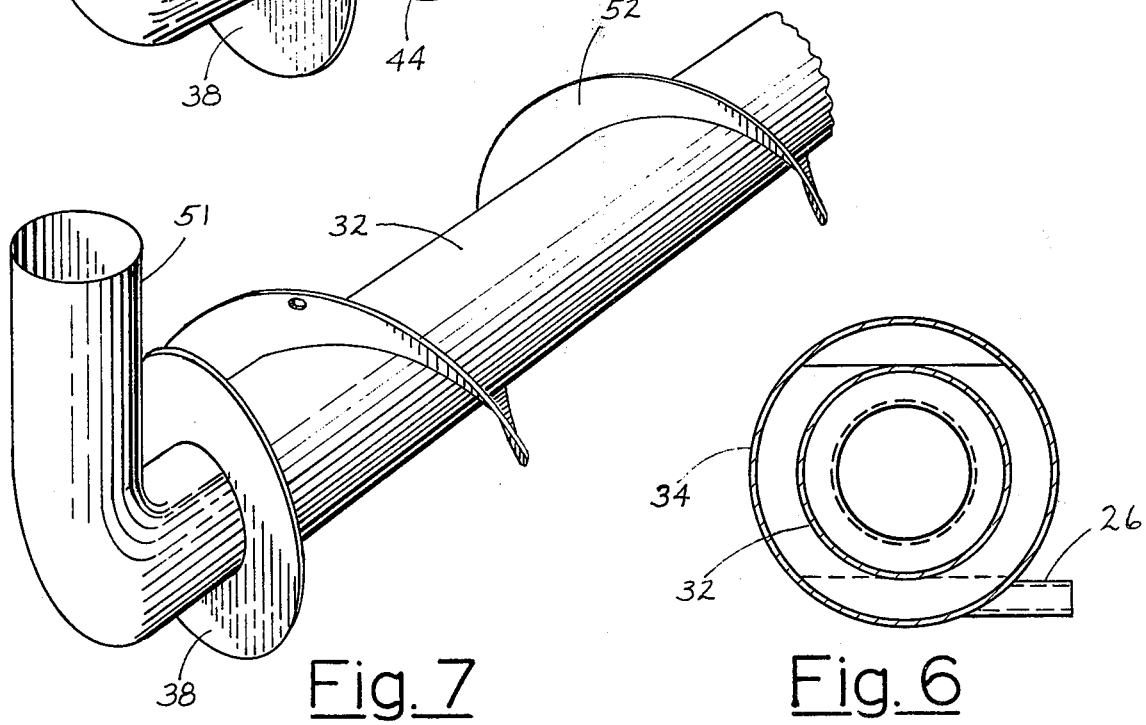
FIG. 6 is a cross sectional view taken generally along line 6—6 of FIG. 4.
FIG. 7 is a fragmented perspective view, similar to FIG. 5, illustrating a further embodiment of the invention including a helical rib for establishing a tortuous path for conducting a stream of water through the heat exchanger.

While the system is illustrated in an above-ground configuration, it should be apparent that the entire system can be buried in the earth, where so desired. Moreover, while the baffle plates 44 serve quite satisfactorily for their intended purpose, a helical rib 52, FIG. 7, where so desired, is employed in lieu of the baffle plates. The helical rib 52, of course, conducts the water along a continuous helical path between the intake port 40 and the discharge port 42 for substantially the same purposes as those for which the baffle plates 44 are employed.

OPERATION

It is believed that in view of the foregoing description, the operation of the system will readily be understood and it will be briefly reviewed at this point.

With the system 10 assembled in the manner hereinbefore described, the power burner 50 is ignited employing a suitable system, for establishing within the fire box 32 a plume for generating a stream of heated gases passing axially through the fire box. The pump 14 is energized, employing a suitable system, for establishing a stream of water extending from the pump to the spray heads 22 mounted on the distribution conduits 12.

The stream of water established by the operation of the pump 14 is projected via the water intake port 40 substantially tangentially into the water jacket 36. The stream now is caused to advance through substantially 270° before passing through the first-in-line opening 48 defined by the surface of truncation 46 for the first-in-line baffle plate 44 and the internal surface of the shell 34. Thereafter, the stream continues to pass along a tortuous path extended along the surface of the fire box 32, in 180° segments, until it exits the water jacket 36, via the dishcarge port 42, in a substantially tangential direction. Of course, the water entering the heat exchanger 16 at the water intake port 40 is relatively cool and is heated as it advances along the surface of the fire box 32, reaching its maximum temperature just prior to exiting the water jacket 36. Thus thermal shock is avoided.

The stream of water then passes via the discharge conduit 26 through a filter 18 whereupon sand and similar particles of matter are extracted from the stream. The stream then exits the filter unit 18, via the supply main 20, and continues to the header 24. Where desired, the dispenser 30 is activated for introducing selected chemicals into the water as it passes from the filter unit 18 to the header 24. The stream is then distributed by the header 24 to the distribution conduits 12 and emitted through the spray heads 22 for forming temperature-controlling bodies of heated mist.

In view of the foregoing, it should readily be apparent that the system of the instant invention provides a practical solution to the perplexing problem of adequately heating and supplying sufficient quantities of water to spray heads for achieving temperature control for ambient atmosphere in large citrus groves and the like utilizing bodies of heated mist.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In an irrigation system of the type including a pressurized source of water, a plurality of distribution conduits connected with said source of water and equipped with a plurality of uniformly spaced spray heads for emitting temperature-controlling bodies of mist, the improvement comprising:

a continuous-flow heat exchanger including a fire box of a tubular configuration, means for conducting a stream of water along the external surface of said fire box in contiguous relation therewith, including a tubular shell concentrically related to the fire box defining a water jacket surrounding the fire box, means defining in said shell a water intake port connected in communication with said source of water and a discharge port connected in communication with said distribution conduits, and means for heating the water of said stream comprising a pressure burner adapted to project a pressurized stream of heated gases axially through said tubular fire box.

2. The improvement of claim 1 wherein said stream of water is conducted in a first substantially axial direction along the external surface of the fire box and said stream of heated gases is projected through said tubular fire box in a substantially axial direction, opposite to the direction in which the stream of water is conducted.

3. The improvement of claim 2 wherein said means for conducting said stream of water along the external surface of the fire box further includes means defining a tortuous path for the stream.

4. The improvement of claim 3 wherein said means defining a tortuous path for said stream of water includes a plurality of axially spaced baffle plates of a truncated configuration.

5. The improvement of claim 3 wherein said means defining a tortuous path for said stream of water includes a helical rib extended along the external surface of saif fire box.

6. The improvement of claim 1 further comprising a filter having a filter intake port and a filter discharge port, said filter intake port being connected in communication with the water jacket of said heat exchanger and said filter discharge port being connected in communication with said distribution conduits, and means connected in communication with said filter discharge port for selectively introducing foreign material into said stream.

7. An improved continuous-flow heat exchanger comprising:
   A. a fire box of a tubular configuration;
   B. means for conducting a stream of water along a tortuous path traversing the external surface of said fire box including a shell defining a water jacket of a cylindrical configuration surrounding said fire box and a plurality of axially spaced truncated baffle plates disposed within the water jacket;
   C. means defining within one end of said water jacket a water intake port, and means defining within the opposite end of said jacket a water discharge port; and
   D. means for projecting a stream of heated gases axially through said fire box.

8. The heat exchanger of claim 7 wherein said intake port comprises an opening having an axis extended substantially tangential with respect to said fire box and said discharge port includes an opening having an axis extended substantially tangential with respect to said fire box.

9. An improved continuous-flow heat exchanger comprising:
   A. a fire box of a tubular configuration;
   B. means for conducting a stream of water in a first axial direction along the external surface of said fire box in contiguous relation therewith including a shell defining a water jacket of a cylindrical configuration surrounding said fire box, and means defining about the external surface of said fire box a tortuous path for the stream of water as it is conducted in a first axial direction including a plurality of axially spaced, truncated baffle plates;
   C. means for defining within one end of said water jacket a water intake port, and means defining within the opposite end of said jacket a water discharge port; and
   D. means for projecting a stream of heated gases axially through said fire box in a second axial direction substantially opposite to said first axial direction.

* * * * *

UNITED STATES PATENT OFFICE
CERTIFICATE OF CORRECTION

Patent No. 3,901,447      Dated August 26, 1975

Inventor(s) Jack R. Gross

It is certified that error appears in the above-identified patent and that said Letters Patent are hereby corrected as shown below:

COLUMN 5, line 16, delete "dishcarge" and insert ---discharge---.

COLUMN 6, line 19, delete "saif" and insert ---said---; and line 61, delete "for".

Signed and Sealed this fourteenth Day of October 1975

[SEAL]

Attest:

RUTH C. MASON
*Attesting Officer*

C. MARSHALL DANN
*Commissioner of Patents and Trademarks*